United States Patent [19]
Kurtz

[11] Patent Number: 5,857,636
[45] Date of Patent: Jan. 12, 1999

[54] METHOD AND APPARATUS FOR PROVIDING SECUREMENT FOR TOY BALLOONS

[75] Inventor: Richard John Kurtz, Arvada, Colo.

[73] Assignee: M & D Balloons, Inc., Manteno, Ill.

[21] Appl. No.: 523,652

[22] Filed: Sep. 5, 1995

[51] Int. Cl.$^6$ .................................................. B65H 54/04
[52] U.S. Cl. .................................. 242/417.1; 242/532.5; 242/532.7; 242/533; 242/535; 242/580
[58] Field of Search ........................... 242/331.1, 412.1, 242/412.2, 412.3, 417, 417.1, 417.3, 419.3, 527, 529, 532.5, 532.6, 532.7, 533, 535, 535.2, 535.3, 580; 226/118

[56] References Cited

U.S. PATENT DOCUMENTS

| | | | |
|---|---|---|---|
| 2,565,325 | 8/1951 | Rich et al. | 242/533 |
| 3,087,688 | 4/1963 | Anderson et al. | 242/533 |
| 3,584,805 | 6/1971 | Lee | 242/412.1 |
| 3,712,553 | 1/1973 | Napor et al. | 242/532.6 |
| 4,218,026 | 8/1980 | Stange | 242/417.1 |
| 4,469,291 | 9/1984 | Treiber et al. | 242/532.7 |
| 4,531,689 | 7/1985 | Beach, Jr. et al. | 242/532.7 |
| 4,714,212 | 12/1987 | Bosco et al. | 242/417.1 |
| 4,963,223 | 10/1990 | Biagotti | 242/580 |
| 5,125,630 | 6/1992 | Hoyt et al. | 242/532.7 |
| 5,301,892 | 4/1994 | Merz et al. | 242/532.6 |
| 5,465,919 | 11/1995 | Kikuchi | 242/532.6 |

FOREIGN PATENT DOCUMENTS

| | | | |
|---|---|---|---|
| 27 18 263 | 10/1978 | Germany | 242/532.6 |
| 39 04 313 A1 | 8/1990 | Germany | 242/580 |
| 1-313110 | 12/1986 | Japan | 242/580 |
| 3-027815 | 2/1991 | Japan | 242/580 |
| 5-338878 | 12/1993 | Japan | 242/580 |

*Primary Examiner*—John P. Darling
*Attorney, Agent, or Firm*—Fitch, Even, Tabin & Flannery

[57] ABSTRACT

A mechanism is provided for unwinding ribbon from a supply spool, for rolling the ribbon to form a wound roll, and for cutting the roll free of the supply. The rolled ribbon segments resulting from this operation are transported to a conveyor for assembly with a toy balloon.

30 Claims, 15 Drawing Sheets

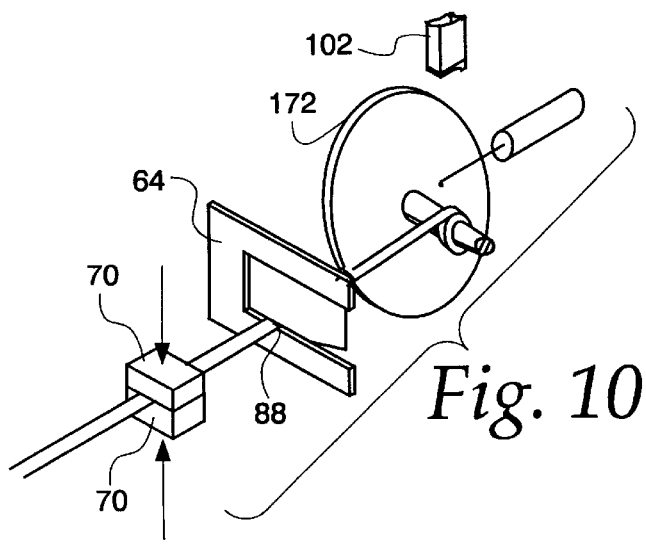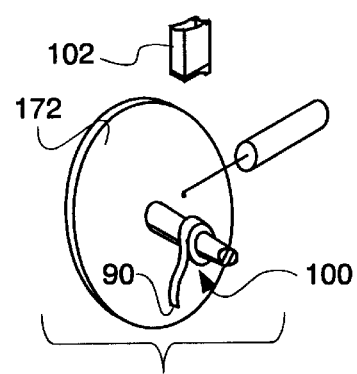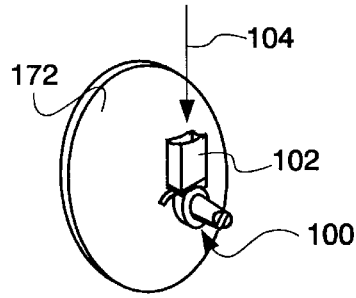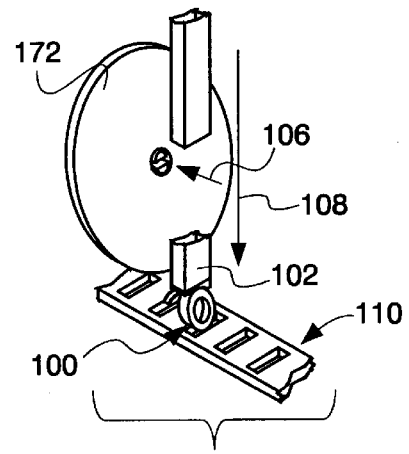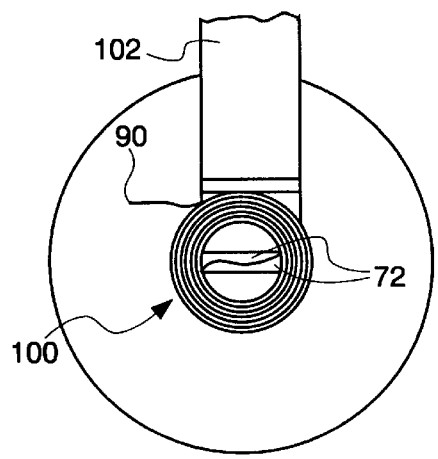
Fig. 10
Fig. 11
Fig. 12
Fig. 13
Fig. 14

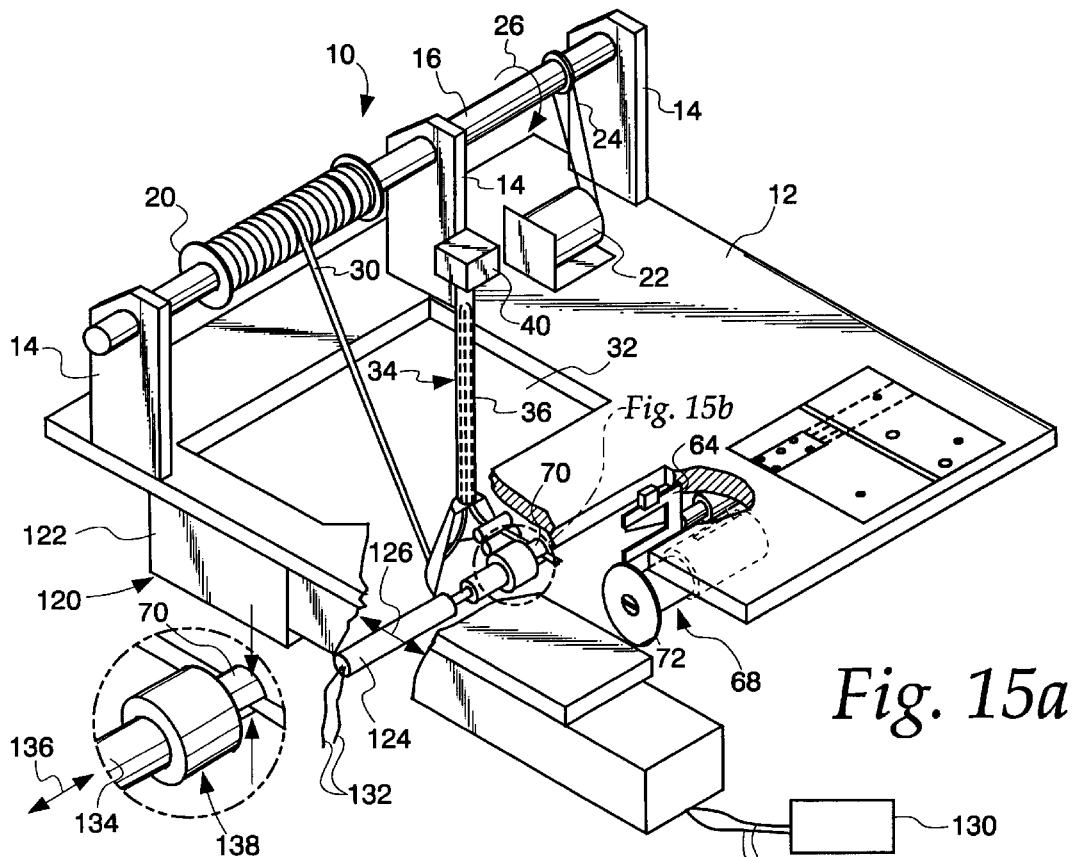
*Fig. 15a*
*Fig. 15b*
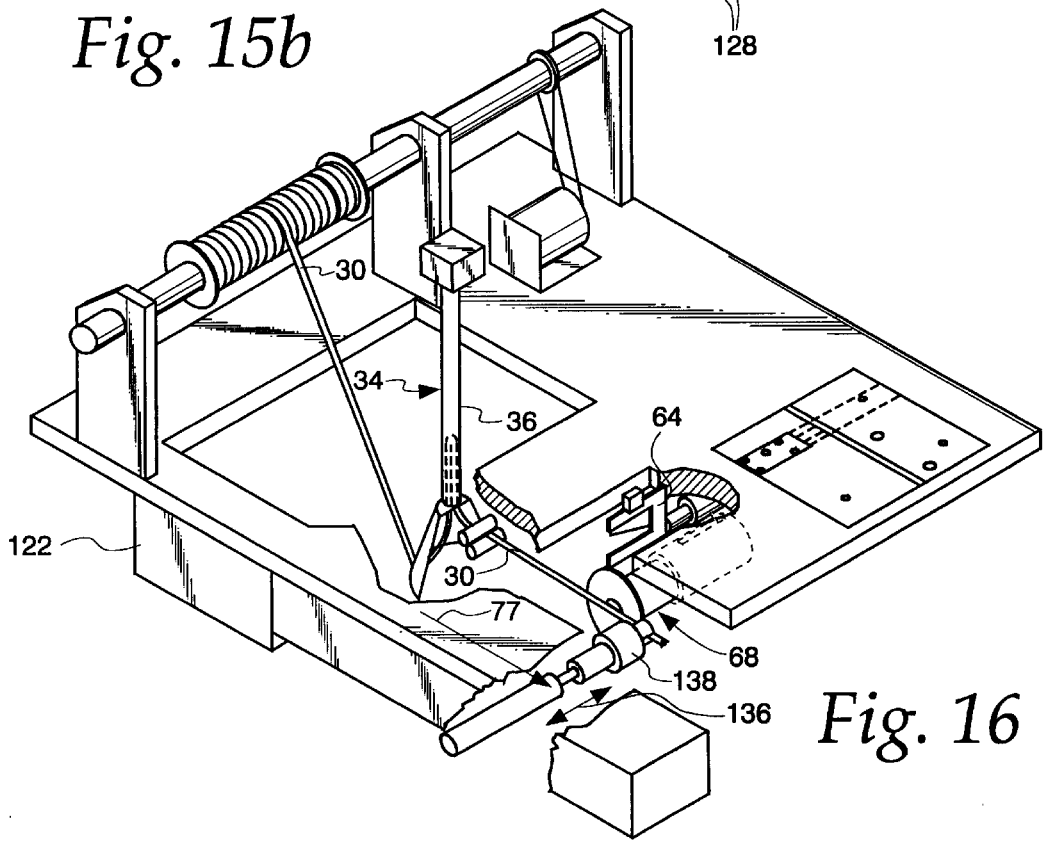
*Fig. 16*

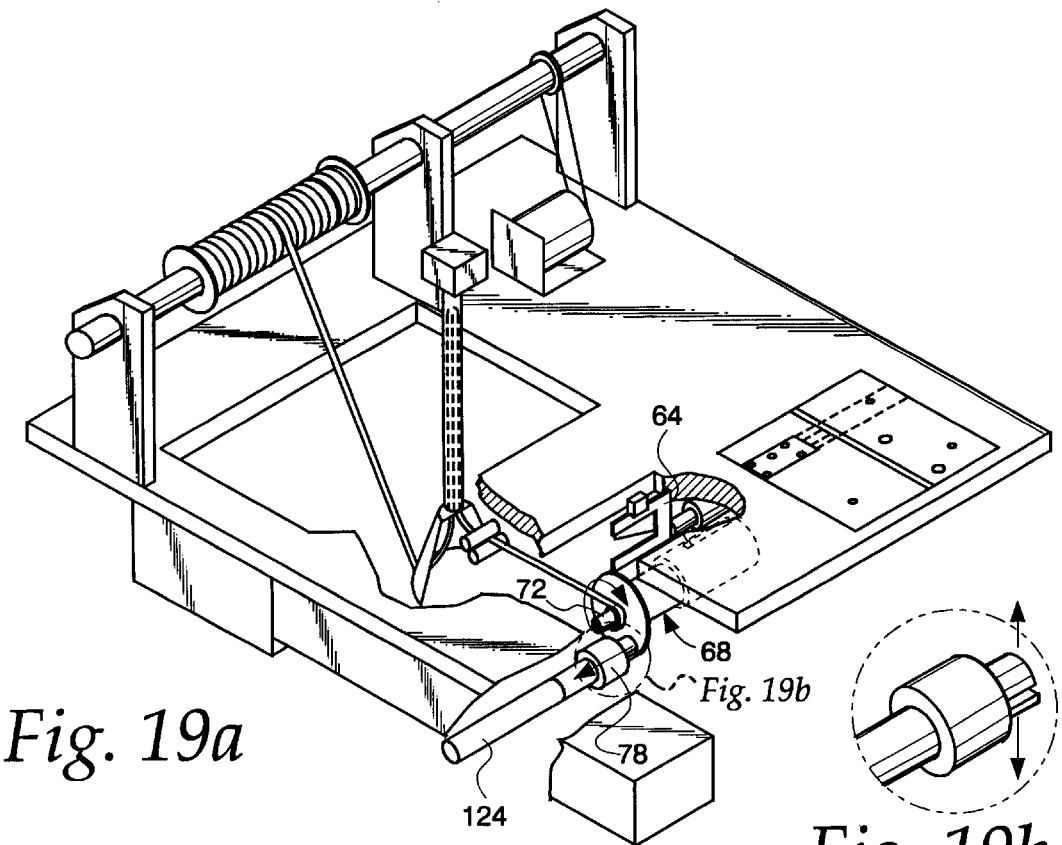
Fig. 19a
Fig. 19b
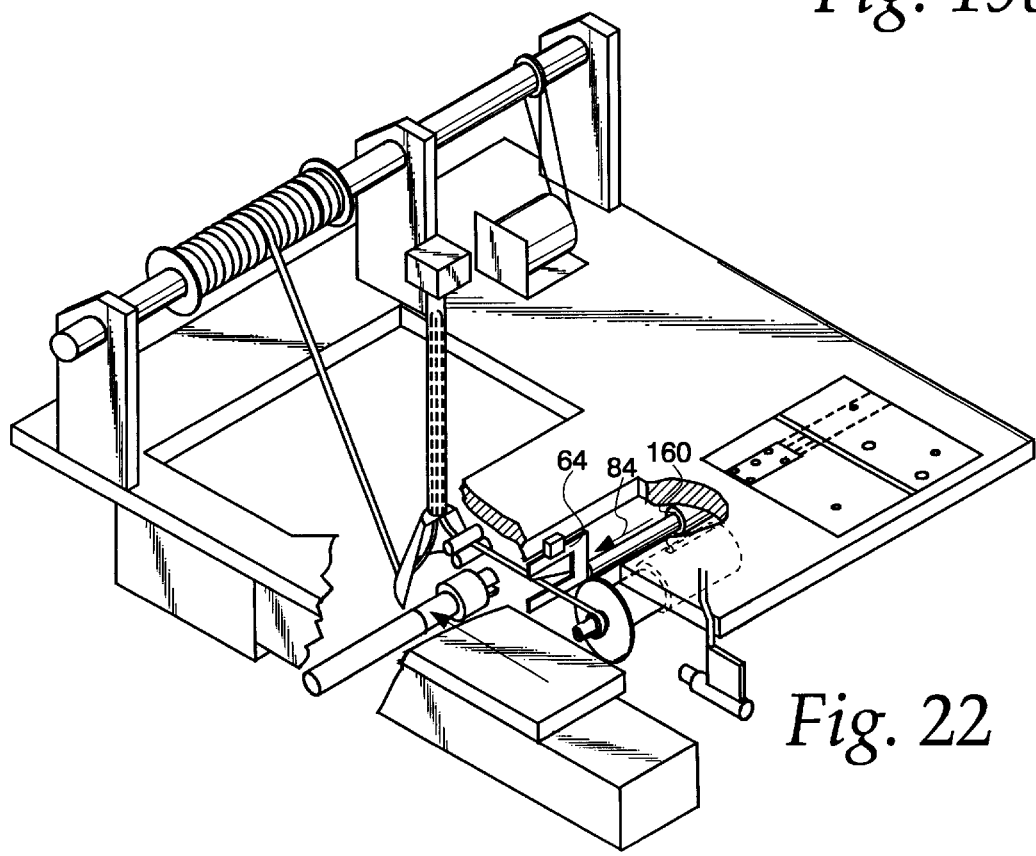
Fig. 22

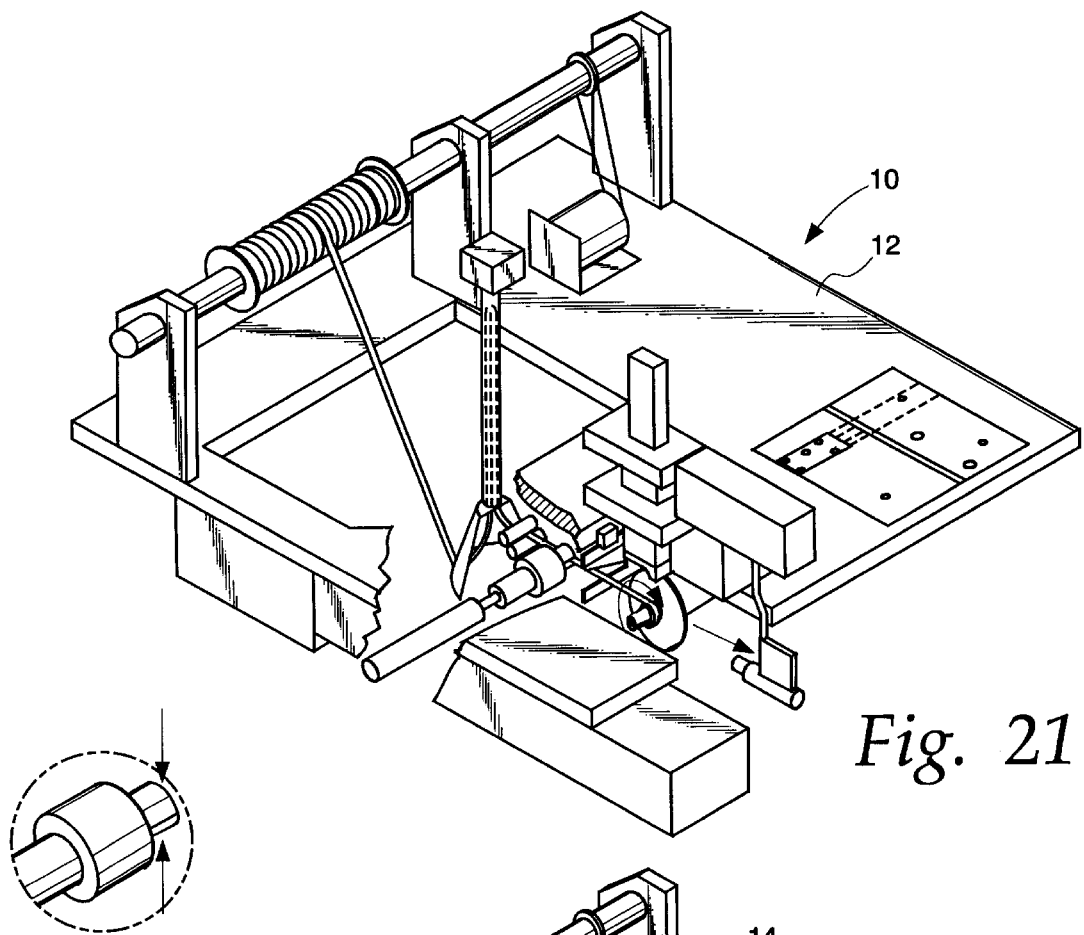
Fig. 21
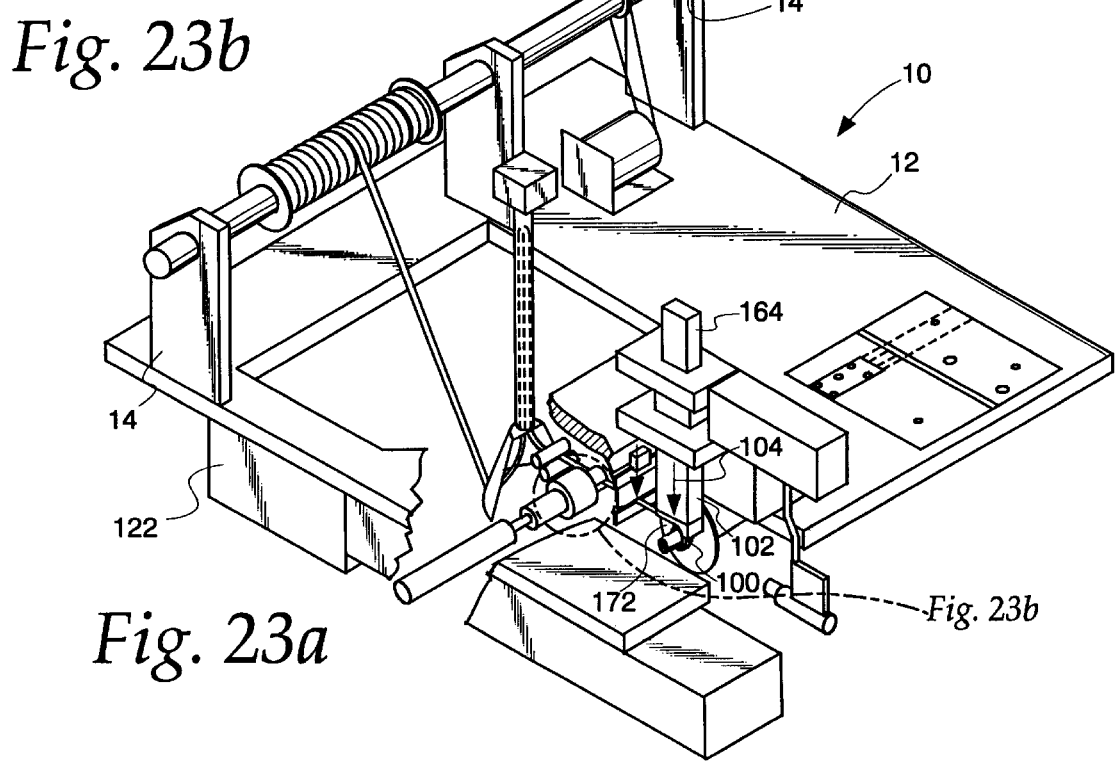
Fig. 23b
Fig. 23a

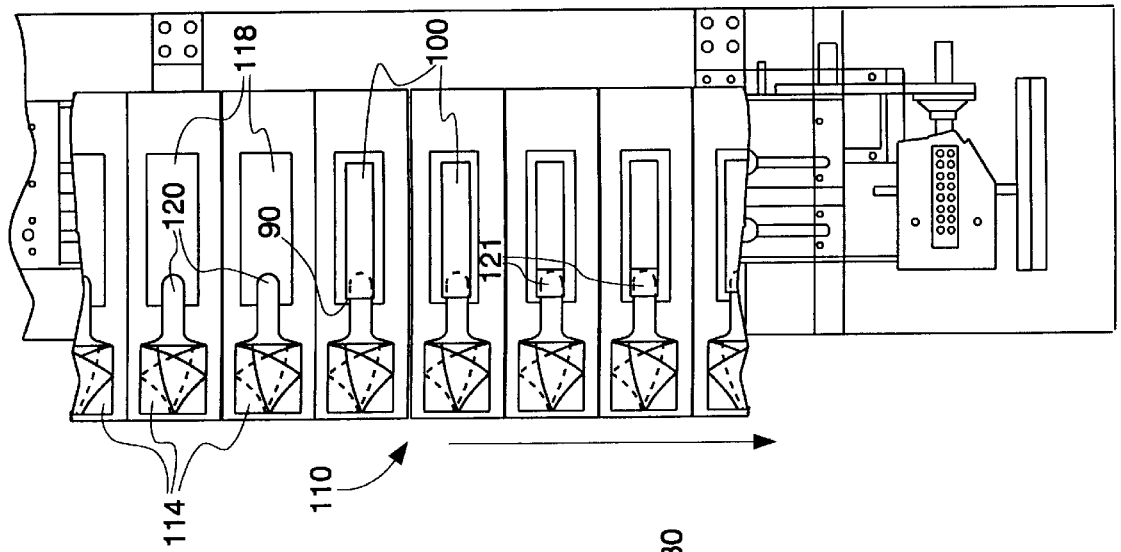
Fig. 29
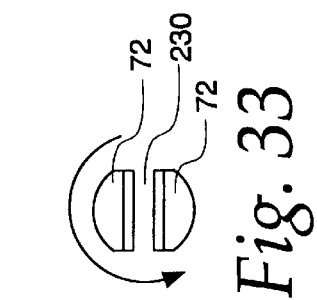
Fig. 26
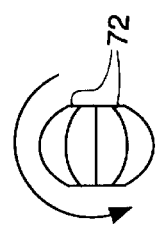
Fig. 33
Fig. 35
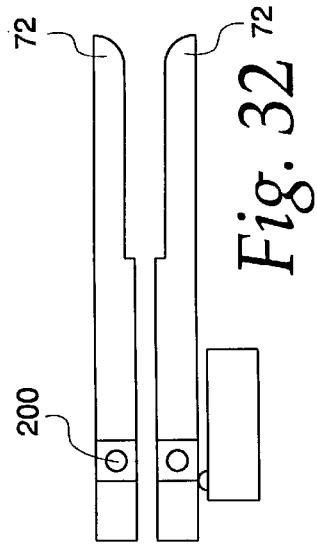
Fig. 32
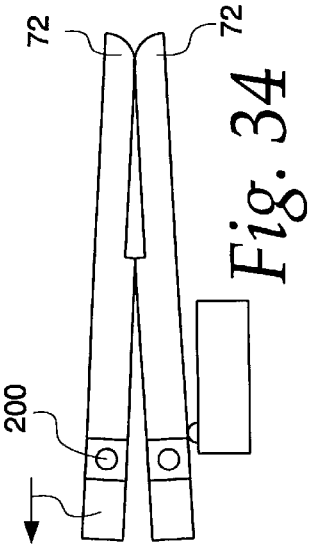
Fig. 34

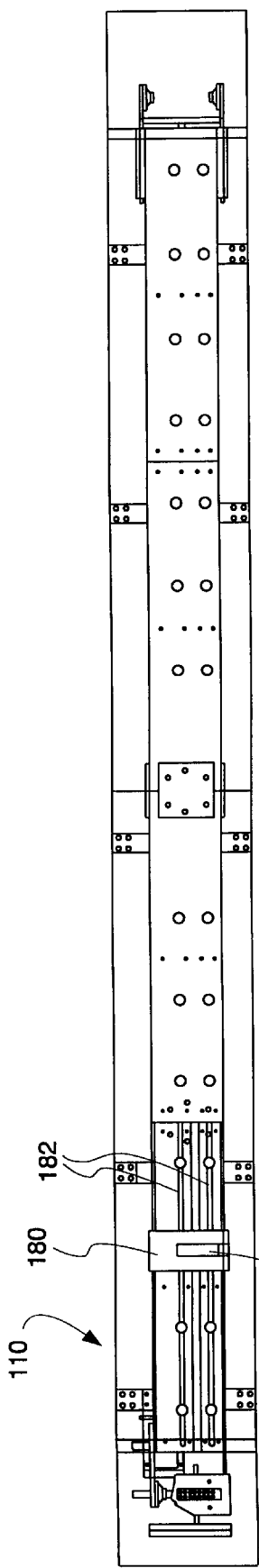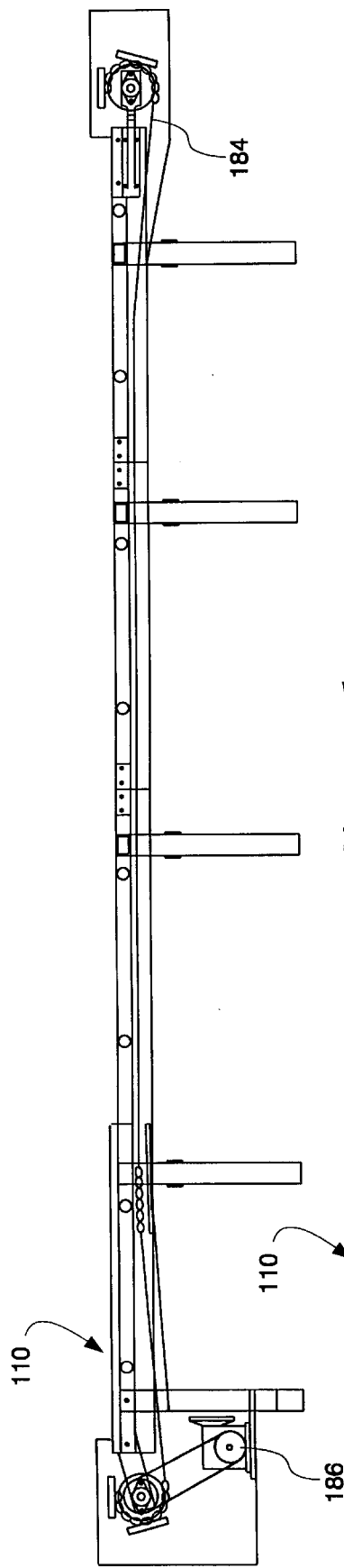
Fig. 27a
Fig. 27b
Fig. 28

METHOD AND APPARATUS FOR PROVIDING SECUREMENT FOR TOY BALLOONS

BACKGROUND OF THE INVENTION

1. Field of the Invention

The present invention pertains to methods and apparatus for securing toy balloons against unintentional release, and in particular to tethers for toy balloons and the manufacture of balloon assemblies having attached tethers.

2. Description of the Related Art

Toy balloons made of metalized films are becoming increasingly popular. These types of balloons are often filled with a gas which is "lighter than air", with the result that the balloons, when released, tend to ascend at a rate such that the balloon quickly passes beyond a person's grasp. In an effort to accommodate users who may not be familiar with this phenomenon, sellers of toy balloons have provided a string or ribbon to the balloon as a convenient tether, to be fastened to the balloon at the time of filling and delivery to a customer. It would be advantageous if the tethers were pre-attached to the balloons by the balloon manufacturer, in an economical manner.

SUMMARY OF THE INVENTION

It is an object of the present invention to provide methods and apparatus for producing tether segments, especially ribbon segments, to be used with toy balloons.

Another object of the present invention is to provide rolled ribbon segments having secured ends suitable for processing using mass production techniques.

Yet another object of the present invention is to provide improved apparatus for forming ribbon segments from a supply roll, including improved accumulator means for rapid feeding of unwound portions of the ribbon supply.

A further object of the present invention is to provide methods and apparatus for assembling rolled ribbon segments with toy balloons.

These and other objects according to principles of the present invention are provided in apparatus for supplying segments of ribbon having opposed major surfaces of preselected width, comprising:

a spool carrying a supply of ribbon to be dispensed, the ribbon having a free end;

gripper means for gripping the free end;

a workstation at which the ribbon is wound to form a roll;

conveyor means for conveying the gripper means to the workstation;

winding means for engaging the ribbon adjacent its free end, for winding the ribbon to form a roll, and for supporting the roll after winding;

cutting means between the winding means and the spool for cutting the ribbon to form a second free end of the ribbon roll;

adhesive means for applying adhesive to the ribbon adjacent the second free end to secure the second free end to the roll; and release means for releasing the roll from the winding means.

Further objects of the present invention are provided in a ribbon dispensing apparatus for providing a segment of ribbon having opposed major surfaces of preselected width for rapid withdrawal, comprising:

a spool carrying a supply of ribbon to be dispensed, the spool having a width at least several times greater than the preselected width;

an elongated vacuum chamber having an opening at one end and an opposed other end from which a vacuum is drawn, the chamber having a cross section sized to receive an open loop of ribbon; and the opening having opposed, spaced-apart sides of width approximately equal to said preselected width; and a funnel-shaped receiver divergingly extending from the opening, guiding a major surface of the ribbon segment to at least partially block the opening, so that, with a vacuum applied to the chamber, the ribbon segment is drawn into the chamber, toward the other end thereof to form an open loop within the chamber.

Other objects of the present invention are provided in a method of making rolls of ribbon segments, comprising:

providing a supply of ribbon having a free end;

providing cutting means for cutting the ribbon to separate a ribbon segment from the supply;

providing a winding means for winding the ribbon into the form of a roll;

moving the ribbon free end past the winding means;

engaging the ribbon, adjacent its free end with the winding means;

winding the ribbon into the form of a roll;

cutting the ribbon to form first and second cut ends, with the first cut end forming a new free end of the supply and the second cut end forming a free end of the ribbon roll;

securing the ribbon free end to the ribbon roll; and removing the roll from the winding means.

Additional objects of the present invention are provided in a method of providing a toy balloon with a ribbon, comprising the steps of:

providing a toy balloon;

providing a roll of ribbon having a free end;

providing a conveyor having a table portion for supporting the toy balloon and an adjacent recess for receiving the ribbon roll and for orienting the ribbon free end to overlie the table portion;

placing the toy balloon on the table portion;

placing the ribbon roll in the recess so as to overlie the toy balloon with the ribbon free end: and securing the ribbon free end to the toy balloon.

Further objects of the present invention are provided in apparatus for providing a toy balloon with a roll of ribbon having a free end, including:

a conveyor having a table portion supporting the toy balloon and an adjacent recess for receiving the ribbon roll and for orienting the ribbon free end to overlie the table portion;

a holder with a first end having a partially recessed opening for receiving the roll;

means for connecting the holder to a source of vacuum to hold the roll of ribbon in the partially recessed opening;

means for lowering the holder adjacent the recess so as to place the ribbon roll in the recess and so as to overlie the toy balloon with the ribbon free end; and means for securing the ribbon free end to the toy balloon.

BRIEF DESCRIPTION OF THE DRAWINGS

FIGS. 4–14 show the steps involved in forming ribbon segments, in diagrammatic form;

FIG. 15a is a perspective view of the apparatus for forming ribbon segments, shown partly broken away;

FIG. 15b is a fragmentary view thereof, shown on an enlarged scale;

FIGS. 16–25 are views similar to FIG. 15a, but showing subsequent steps of operation;

FIG. 26 is a fragmentary perspective view of the vacuum holder used in the apparatus;

FIG. 27a is a top plan view of apparatus used for fabricating balloon assemblies, using the rolled ribbon segments;

FIG. 27b is a side elevational view thereof;

FIG. 28 is an end elevational view thereof;

FIG. 29 is a fragmentary top plan view of the apparatus of FIG. 26;

FIGS. 32–35 are schematic views showing the operation of the spindle apparatus;

DETAILED DESCRIPTION OF THE PREFERRED EMBODIMENT

Figure 1:
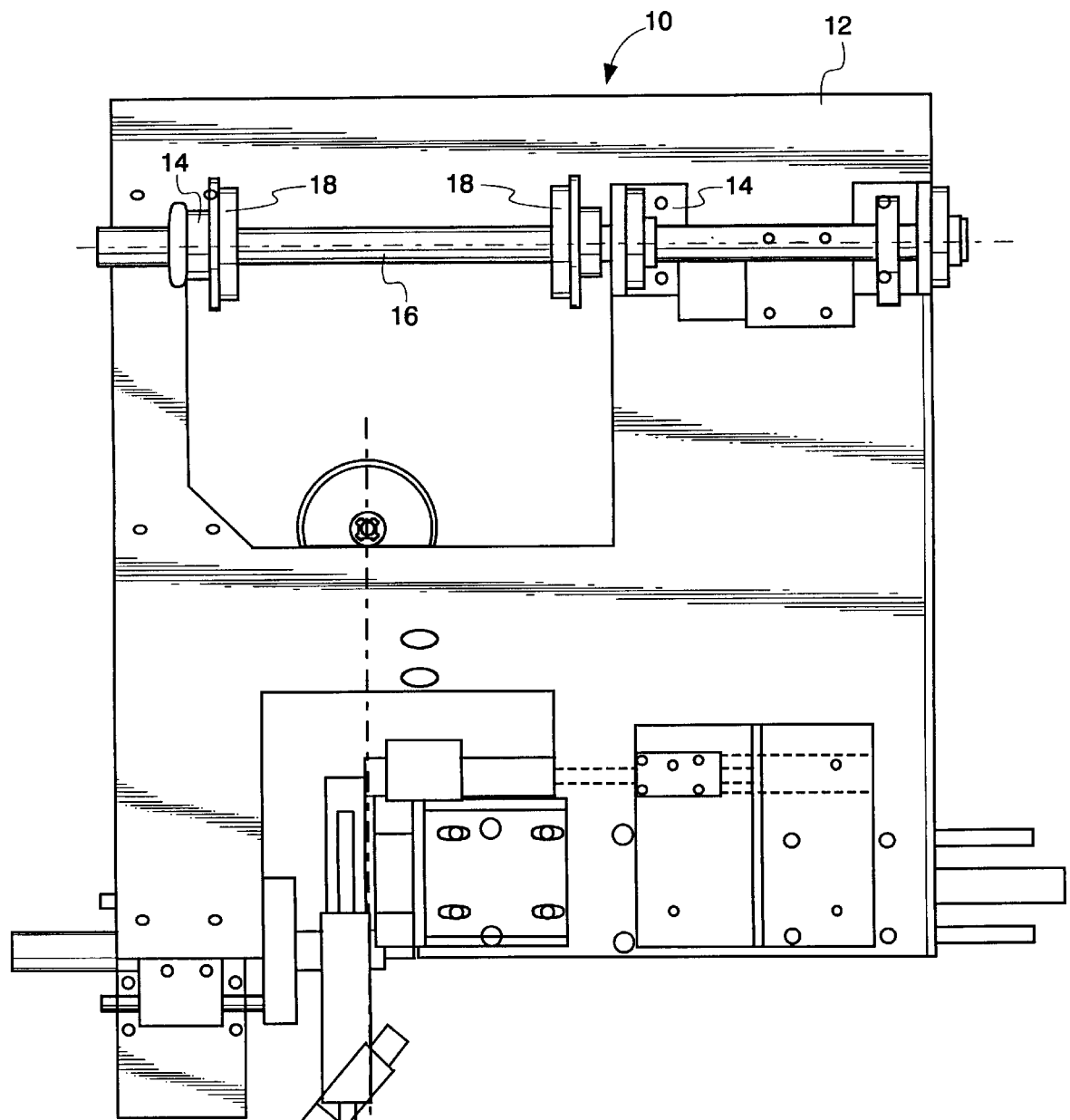
FIG. 1 is a top plan view of apparatus for forming ribbon segments.
Figure 2:
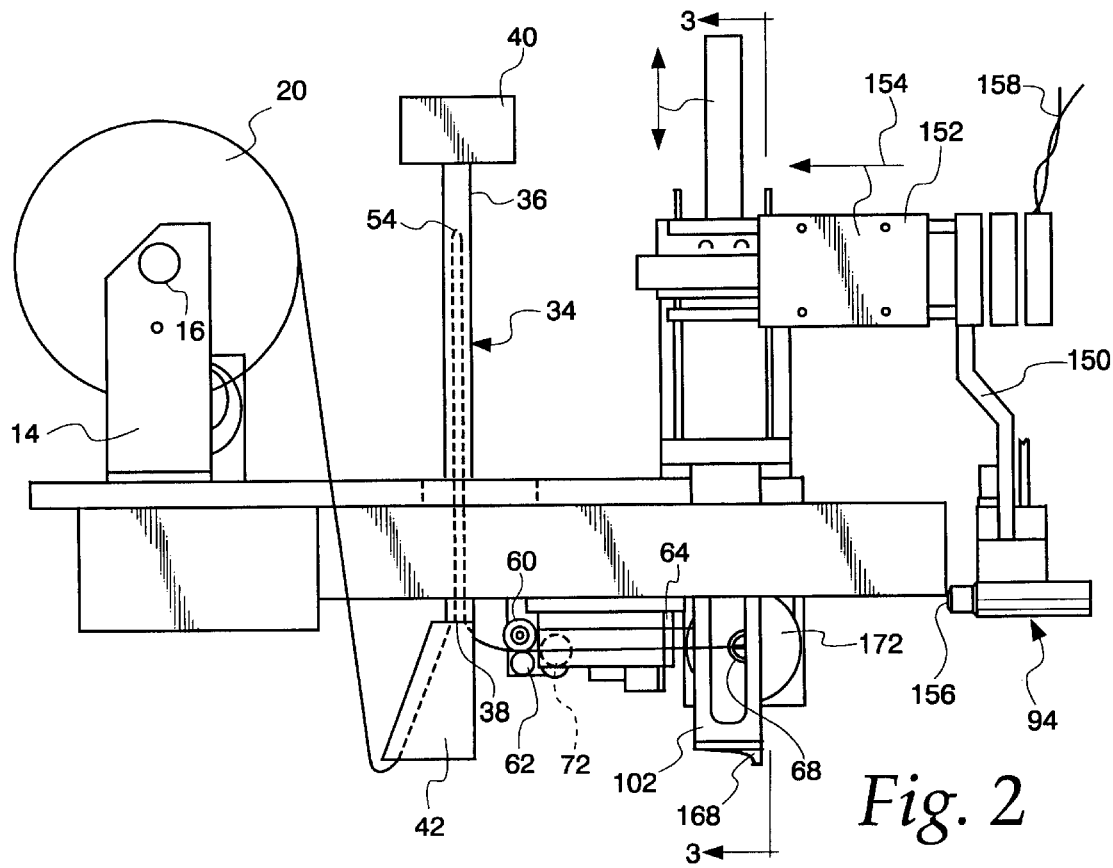
FIG. 2 is a front elevational view thereof.
Figure 3:
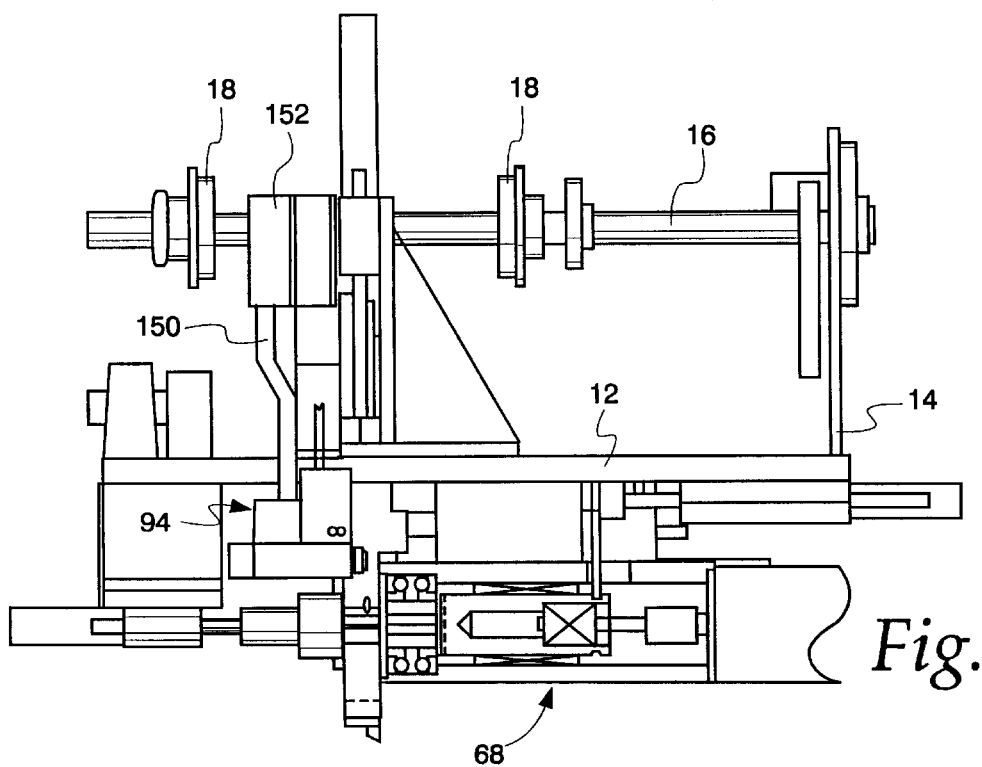
FIG. 3 is a cross-sectional and elevation view thereof taken along the line 3—3 of 2.

Referring now to the drawings, and initially to FIGS. 1–3, there is shown an apparatus 10 for providing ribbon segments in rolled form. Apparatus 10 includes a mounting plate 12 carrying supports 14 for a shaft 16. Stepped collars or flanges 18 are mounted on shaft 16, and clamp a supply roll 20 for unloading. Referring briefly to FIG. 15a, shaft 16 is preferably driven by motor 22 and belt 24 in the direction of arrow 26 so as to assist in unrolling ribbon 30 from supply roll 20. If desired, motor 22 can be operated so as to "spill" a loop of ribbon in cavity 32 formed in mounting plate 12, although it is generally preferred that the ribbon be unrolled without substantial spillage in response to tension forces generated in a vacuum accumulator generally indicated at 34.

Figure 38:
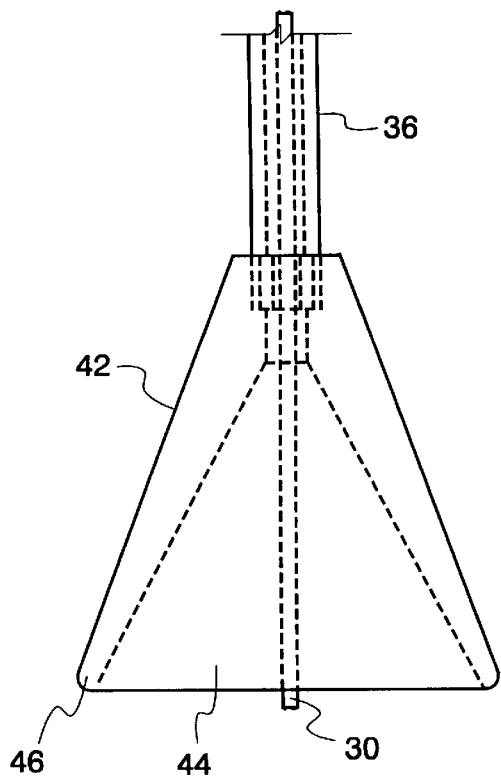
FIG. 38 is an end view thereof.
Figure 36:
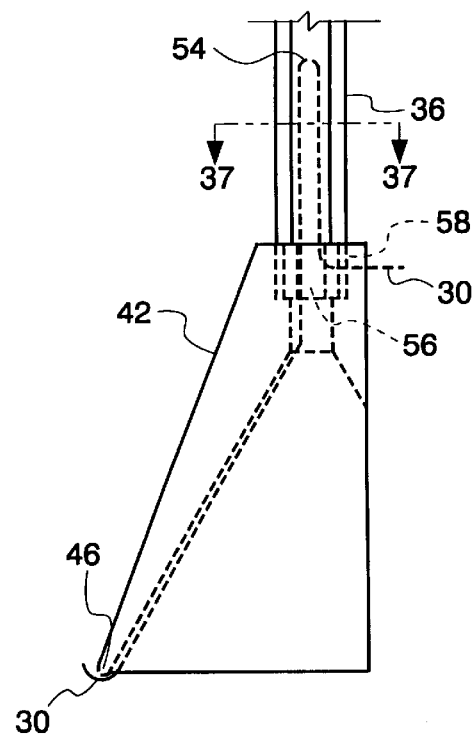
FIG. 36 shows the vacuum accumulator of FIG. 2 in greater detail.
Figure 37:
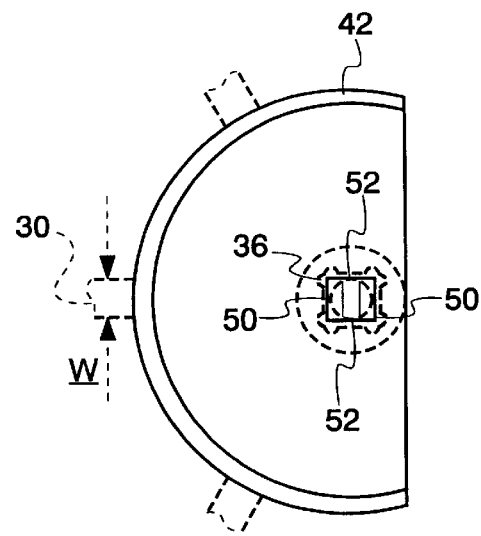
FIG. 37 is a top plan view thereof.

Referring additionally to FIGS. 36–38, the vacuum accumulator 34 includes a vertically elongated vacuum chamber 36 having a lower open end 38 with an opening 58 through which ribbons 30 emerges and an upper open end which is evacuated by vacuum source 40. A funnel-shaped receiver 42 extends from the lower end 38 of vacuum chamber 36. Receiver 42 has a part circular opening 44 at its lower end, formed by part circular rounded end wall 46. As can be seen in the cross-sectional view of FIG. 37, the vacuum chamber 36 has a generally rectangular configuration, with a first pair of opposed sidewalls 50 corresponding to the width w of ribbon 30 (see FIG. 37). The remaining pair of opposed sidewalls 52 are sized to accommodate an open loop 54, shown for example in FIGS. 2 and 36. As can be seen in FIGS. 36 and 37, the ribbon blocks substantial portions of the bottom open end 56 of vacuum chamber 36, so that the vacuum created by source 40 is applied against the flexible ribbon 30, drawing the ribbon in an upward vertical direction within the vacuum chamber for subsequent out-feed on demand. If residence time of the ribbon loop in the vacuum chamber is substantial, then it is preferred that action be taken to control the ribbon loop. In the preferred embodiment, vacuum within the chamber is held constant. Thus, as the ribbon loop experiences vacuum forces in the chamber, the loop will be drawn upward toward the vacuum source. Photoelectric sensors (not shown) located at the top of the vacuum chamber cause motor 22 to turn on and off as required, so as to maintain a full ribbon loop within the vacuum chamber. When motor 22 is turned on, it allows ribbon from the spool to be pulled into the vacuum chamber 36 under power of the vacuum source. When sufficient ribbon is pulled in, the upper photoelectric sensor shuts the motor off, with the motor acting as a brake to prevent further ribbon from being withdrawn into the vacuum chamber. As ribbon is drawn out of the chamber during a rolling process, a second photoelectric sensor (not shown) disposed at a lower position operates to start motor 22, allowing additional ribbon to be fed into the vacuum chamber to replenish the ribbon withdrawn during a rolling operation. Alternatively, the vacuum source could be made variable, with the photoelectric sensors turning the vacuum on or off or reducing the magnitude of the vacuum so as to maintain the ribbon loop within desired limits within the vacuum chamber.

Preferably, a motor 22 provides unwinding force sufficient to overcome frictional losses in shaft 16, so as to allow spool 20 to be essentially "free wheeling" (or alternatively to have only a slight frictional force, which is readily overcome by the drawing force of vacuum force 40) as the ribbon is pulled from spool 20 into the vacuum chamber 36. As can be seen for example in FIG. 15a, ribbon 30 is preferably provided on a spool 20 which is many times wider than the width w of ribbon 30. As will be seen herein, it is important that the accumulated ribbon be provided at a constant position, for feeding along a fixed generally linear path. The funnel-shaped receiver 42, in combination with the vacuum chamber 36, has been found to provide an effective, reliable unspooling of ribbon 30 without requiring additional apparatus.

Referring to FIGS. 1–3 and 15a, ribbon 30 leaving vacuum accumulator 34 passes through guide rollers 60, 62 passing cutting blade 64, which is preferably located adjacent guide rollers 60, 62. The ribbon then extends past a winding spindle 68 (shown in cross section in FIG. 3, and in greater detail in FIGS. 30 and 31, as will be seen herein). The accumulated ribbon is wound about spindle 68 to form a roll, which is cut free from supply roll 20 by cutting blade 64.

Figure 4:
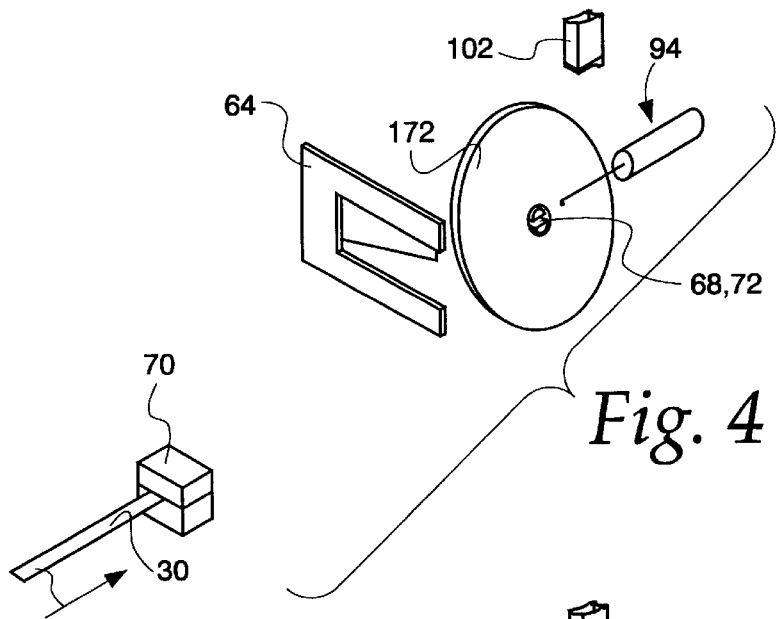
Figure 5:
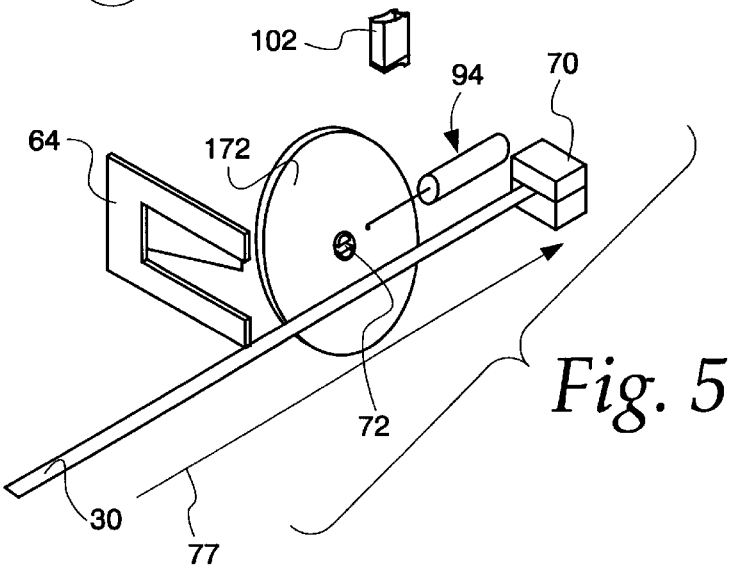
Figure 6:
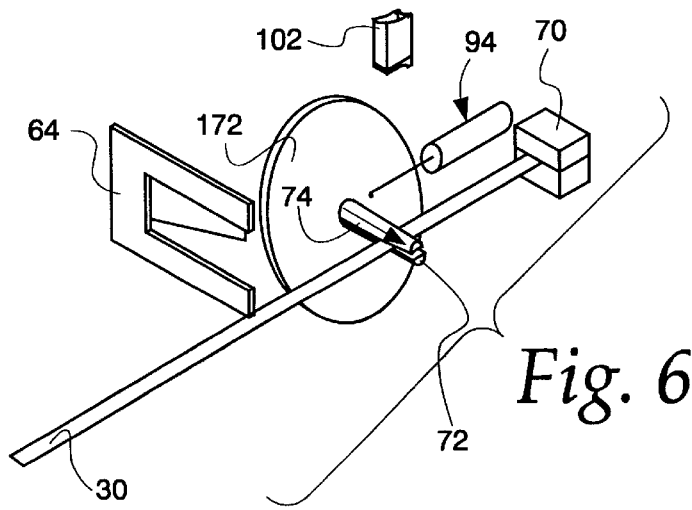
Figure 7:
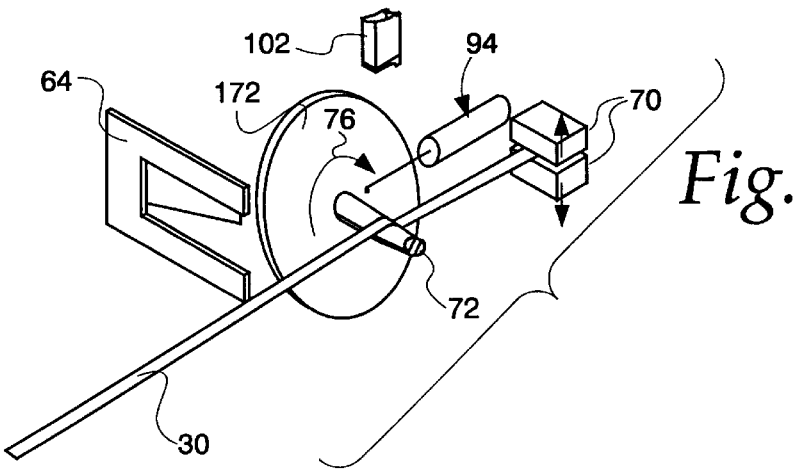
Figure 8:
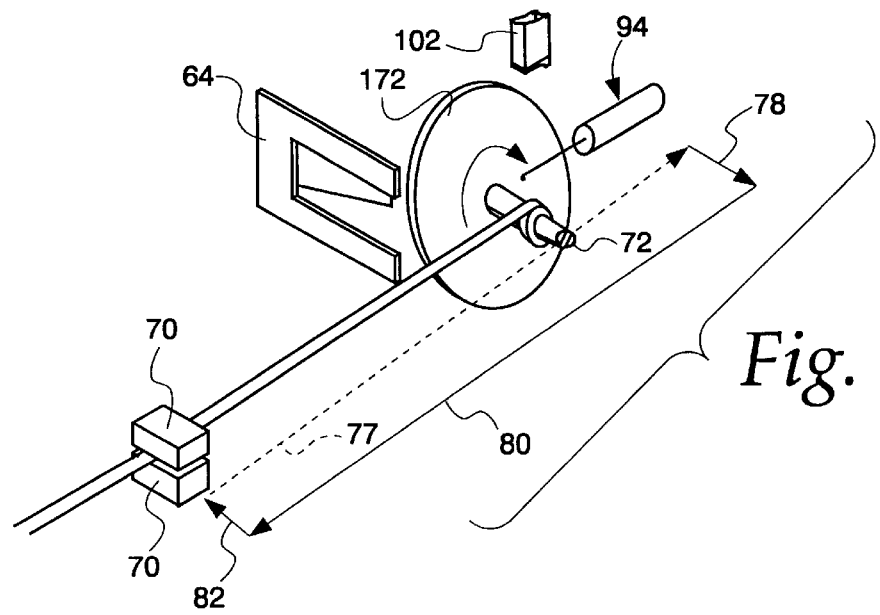

Referring now to FIGS. 4–14, a brief overview of the fabrication steps will be described. Referring first to FIG. 4, ribbon 30 is grasped by the jaws 70 of a traveling gripper arm which moves the ribbon past cutting blade 64, and also past spindle 68, as shown in FIG. 5. Referring to FIG. 6, the jaws 72 of spindle 68 are extended in the direction of arrow 74 so as to pass around ribbon 30. As shown in FIG. 7, the jaws 72 are rotated in the direction of arrow 76 a slight amount so as to hold ribbon 30 captive as jaws 70 of the traveling gripper arm release their hold on the ribbon. As shown in FIG. 8, the jaws 70 are then pulled back away from the line of travel of the ribbon, as indicated by arrow 78, are moved back to a position adjacent the traveling guide rollers 60, 62 (as indicated in phantom in FIG. 2), and are then moved around the path of travel of the ribbon, to the home position indicated in FIGS. 8 and 9. In the home position, the jaws 70 are maintained spaced apart, so as to allow the ribbon to pass freely therebetween.

Figure 9:
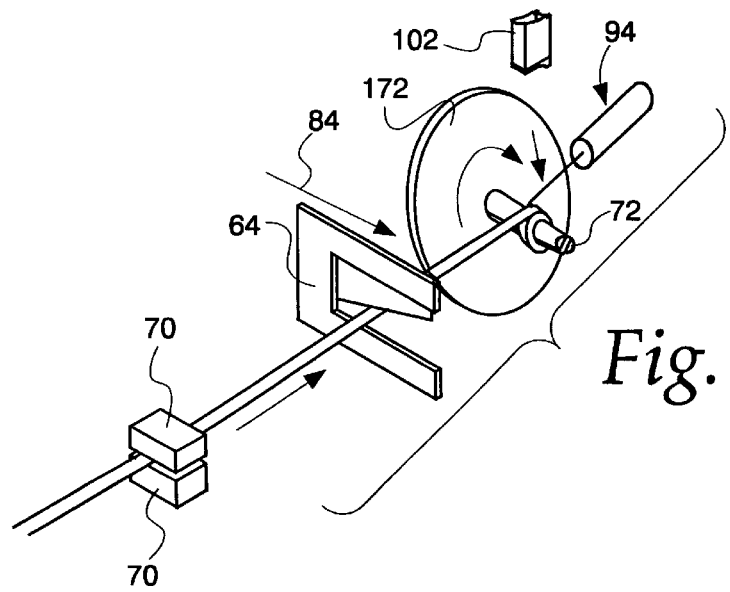

Winding of the spindle continues until a sufficient quantity of ribbon is rolled onto the spindle jaws 72. The cutting blade 64 is then activated in the direction of arrow 84 to cut the ribbon 30, forming two new free ends 88, 90 (see FIGS. 10 and 11). An adhesive applicator generally indicated at 94 applies a dot of adhesive to the rolled ribbon, as indicated in FIG. 9, at a point shortly before or after cutting of the ribbon by blade 64. As indicated in FIG. 10, the jaws 70 of the traveling gripper arm are preferably closed to clamp the ribbon, either concurrently or shortly before the cutting of the ribbon is completed. Preferably, between FIGS. 9 and 10, spindle jaws 72 are rotated one additional revolution, so as to bond the newly formed free end of the rolled ribbon segment to the roll to prevent unintentional unwinding of the roll.

As indicated in FIGS. 10 and 11, substantial free portions of ribbon are provided between the jaws of the traveling gripper arm and the cut end 88, in between the wound portions of the rolled ribbon segment and cut free end 90. At the point of time indicated in FIG. 11, formation of the rolled ribbon segment generally indicated at 100, is complete. A holder 102 is then lowered in the direction of arrow 104 onto the rolled ribbon segment 100 and engages the rolled ribbon segment with a vacuum force, as will be seen herein. As indicated in FIG. 13, the spindle jaws are retracted in the direction of arrow 106 and the holder 102 is lowered in the direction of arrow 108 into a recessed conveyor apparatus generally indicated at 110. The holder 102 then disengages from the rolled ribbon segment 100 and retracts to a home position shown for example in FIGS. 10 and 11. FIG. 14 shows the arrangement of FIG. 12 from a front elevational perspective.

Referring briefly to FIG. 29, the rolled ribbon segments 100 are deposited in pockets 118 of conveyor apparatus 110, with the free end portions 90 extending toward balloons 114. The balloons have been folded to assume a generally rectangular package, with balloon stems or necks 120 extending toward the pockets 118. As indicated in FIG. 29, the free ends of the rolled ribbon segments partially overlie the necks 120 of balloons 114. The rolled ribbon segments and balloon necks are then bonded at 121 using conventional bonding means, such as tape, heat sealing or adhesive, for example. In the preferred embodiment, adhesive tape segments are applied to connect the rolled ribbon segments to the balloons 114.

Referring now to FIGS. 15–25, further details of the operation of apparatus 10 will be described. Referring to FIG. 15, the traveling gripper arm is generally indicated at 120. The traveling gripper arm includes an actuator which moves air slide 124 in the directions of double-headed arrow 126. Actuator 122 preferably comprises actuator stock item number IA 12 EX-35-200, available from Intelligent Actuator located at 357 Van Ness Way, Suite 29, Torrance, Calif. 90501. Actuator 122 receives instructions from a controller 130, through conductors 128. Air slide 124, carried by actuator 122, receives instructions from controller 130 through conductors 132 (shown in FIG. 15), causing the air slide shaft 134 to move back and forth in the direction of arrow 136 (see FIGS. 15, 16). A gripper mechanism 138 is carried on a shaft 134 so as to be movable back and forth in the direction of arrow 136. Preferably, gripper mechanism 138 comprises a remotely actuable air gripper commercially available from Compact Air Products located at 2424 Sandifer Blvd., Westminster, S.C. 29693 as Part No. PSG-052X1/4-LF, and air slide 124 preferably comprises Stock No. TS031X1-N-B-M, commercially available from PHD Company located at 9009 Clubridge Dr., Fort Wayne, Ind. 46899.

Gripper mechanism 138, which includes gripper jaws 70, moves the gripper jaws toward and away from one another so as to clamp and unclamp ribbon 30 therebetween, in response to air signals transmitted to the gripper mechanism through an air supply (not shown) under control of controller 130. Under management of controller 130 actuator 122 and air slide 124 cooperate to form the path of travel of gripper jaw 70 illustrated in FIG. 8. As will now be appreciated, the path of travel comprises a closed loop including the movements indicated by arrows 77, 78, 80 and 82 illustrated in FIG. 8. The arrow 77 corresponds to the movement of the gripper jaws described in FIGS. 4 and 5 from the "home" position illustrated in FIG. 15a to a position past the spindle 68 (as shown in FIG. 16).

Figure 17:
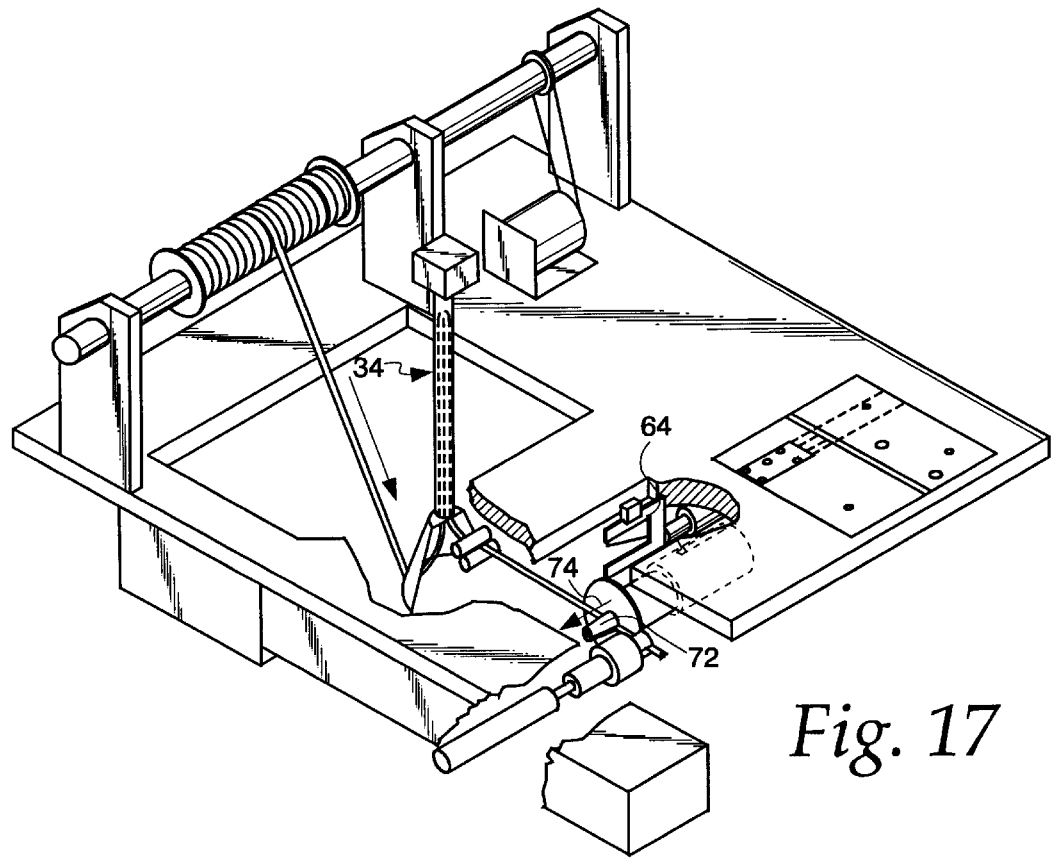
Figure 18:
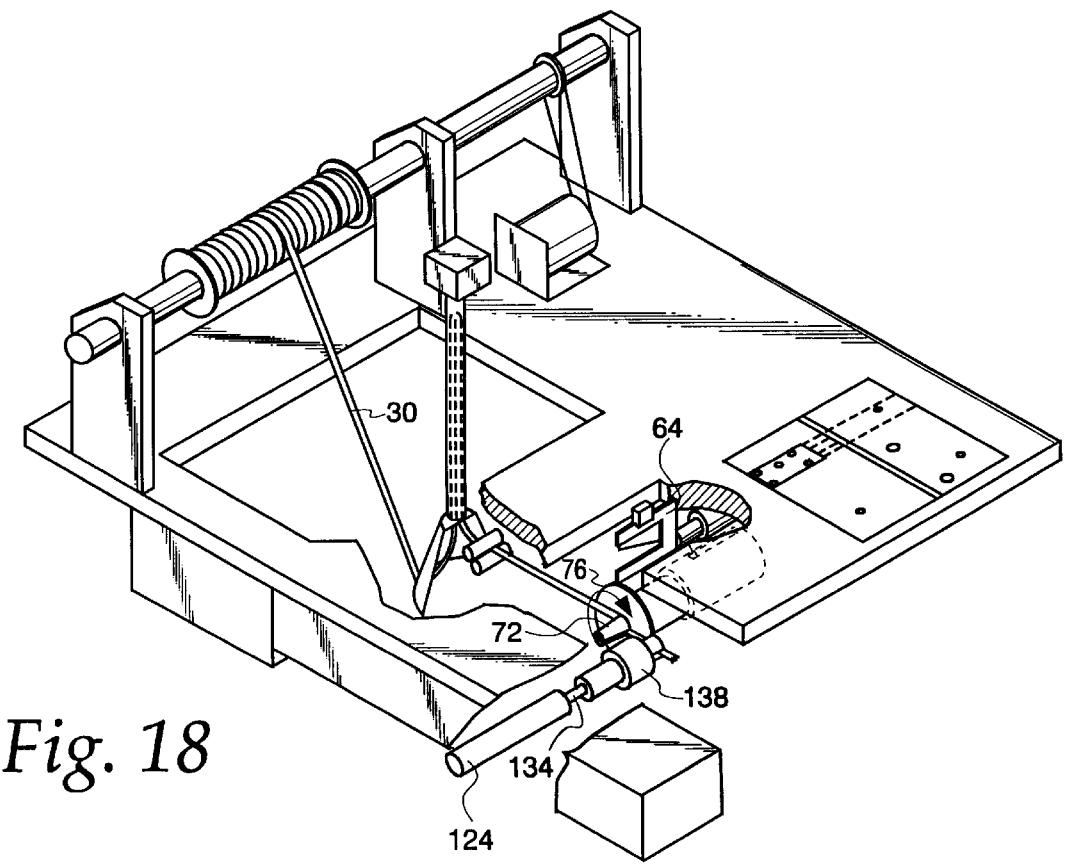

The gripper jaws 70 are closed (see FIG. 15b) when gripper mechanism 138 is in the position illustrated in FIG. 15a. The gripper jaws remain closed during movement between FIG. 15a and 16 as the gripper mechanism 138 is moved in the direction of ribbon travel, by actuator 122. During this time, ribbon is drawn from the vacuum accumulator 34, and FIG. 16 shows the open loop of ribbon in the vacuum chamber 36 being consequently lowered. With the arrival of gripper mechanism 138 at the position illustrated in FIG. 16, payout of ribbon 30 is temporarily halted. As indicated in FIG. 17 (and as explained above in FIG. 6), the spindle jaws 72 are extended in the direction of arrow 74 such that ribbon 30 is positioned between the jaws 72 in preparation for the partial winding of the ribbon about the spindle jaws, as illustrated in FIG. 18. This partial winding corresponds to that described above with reference to FIG. 7.

As indicated in FIG. 17, the open loop of ribbon in vacuum accumulator 34 is quickly recovered with ribbon being unspooled from the supply 20. An air signal is then sent to the gripper mechanism 138 such that jaws 70 are retracted, releasing their grip on ribbon 30. Operation of the gripper mechanism, as indicated above, is carried out via air command signals. Control for operation of the gripper mechanism is preferably initiated by the electronic control means 130, with the simple expedient of having an electrically operated solenoid opening a valve in an air pressure line, coupling the source of air pressure to the gripper mechanism. Other pneumatic control signals are accommodated accordingly.

As indicated in FIG. 19, the gripper mechanism, with jaws opened, is retracted upon operation of air slide 124 corresponding to the movement indicated by arrow 78 in FIG. 8. Spindle 68 is again energized under commands from controller 130 to carry out a high speed winding operation, in which a desired quantity of ribbon is rolled about the spindle jaws 72 in the manner described above with reference to FIG. 8.

Figure 20:
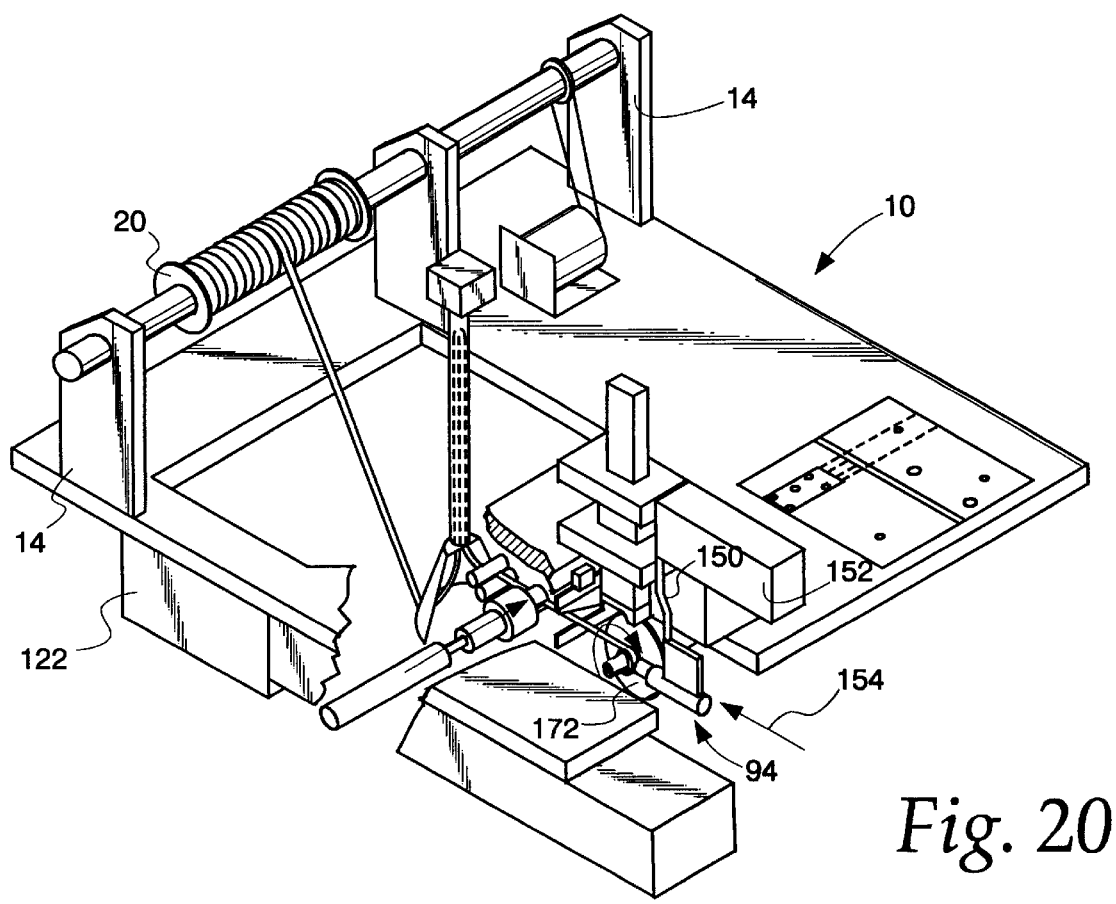

With a desired amount of ribbon acquired by spindle jaws 72, but with the ribbon still continuously extending from supply spool 20, the adhesive applicator 94 is moved from its home position (illustrated in FIG. 2) to the position illustrated in FIG. 20 and schematically illustrated in FIG. 9. The adhesive applicator 94 is coupled through a mounting arm 150 to a conventional linear actuator 152. Actuator 152 moves the adhesive applicator 94 in the direction of arrow 154 such that the tip 156 (see FIG. 2) of the applicator touches the roll of ribbon acquired on spindle jaws 172. Control signals are then sent via conductors 158 (see FIG. 2)

to the adhesive applicator 94 under commands from controller 130, to deposit a small quantity of adhesive on the outermost wound layer of ribbon. During this time, the actuator 122 moves the gripper mechanism in the manner indicated by arrow 80 (see FIG. 8) to a point adjacent the "home" position and air slide 124 is actuated so as to extend shaft 134, placing the gripper jaws 70 at the home position illustrated in FIG. 15a. Adhesive applicator is then retracted, as indicated in FIG. 21, and the spindle jaws 172 undergo a final revolution to secure an additional outer winding of ribbon to the roll of ribbon previously acquired.

With reference to FIG. 22, solenoid 160 is actuated under control of controller 130 so as to extend cutting blade 64 in the direction of arrow 84, as described above with reference to FIG. 9. The gripper jaws 70 are then closed to clamp about ribbon 30, in the manner indicated in FIG. 23, and the cutting blade 64 is then actuated under control of controller 130 to sever the ribbon in the manner described above with reference to FIG. 10, forming cut ends 88, 90, thereby freeing the ribbon acquired on spindle shaft 68 from supply roll 20.

At a time just before actuation of cutter blade 64, holder 102 is lowered in the direction of arrow 104, as described above with reference to FIG. 12. Holder 102 is hollow, and has an upper end 164 which is connected to a vacuum source (not shown) so as to create a suction force releasably holding the rolled ribbon segment 100. With reference to FIG. 26, holder 102 carries a roll-receiving shoe 168 which is generally L-shaped in profile. As indicated by the arrows in FIG. 26, a vacuum is applied to the shoe 168 so as to draw the rolled ribbon segment 100 against the shoe. As shown in FIG. 26, less than half of the outer surface of the coil portion of rolled ribbon segment 100 is engaged by shoe 168, and further, a portion of the unsecured tail (which terminates in cut end 90) is also engaged by vacuum force, and is pressed against vacuum shoe 168. Thus, the tail portion of the ribbon extending beyond the vacuum shoe is held in a generally horizontal position or a position of limited downward bending such that, upon placement in pockets 118, the tail portion will reliably overlap the balloon stems 120, as explained above with respect to FIG. 29.

Returning again to FIG. 23, the holder 102 has been lowered into engagement with the rolled ribbon segment 100 which is further supported by the jaws 72 of the spindle 68. As indicated in the figures, a washer-like wall portion 172 has a central aperture through which the spindle jaws 72 extend.

Figure 24:
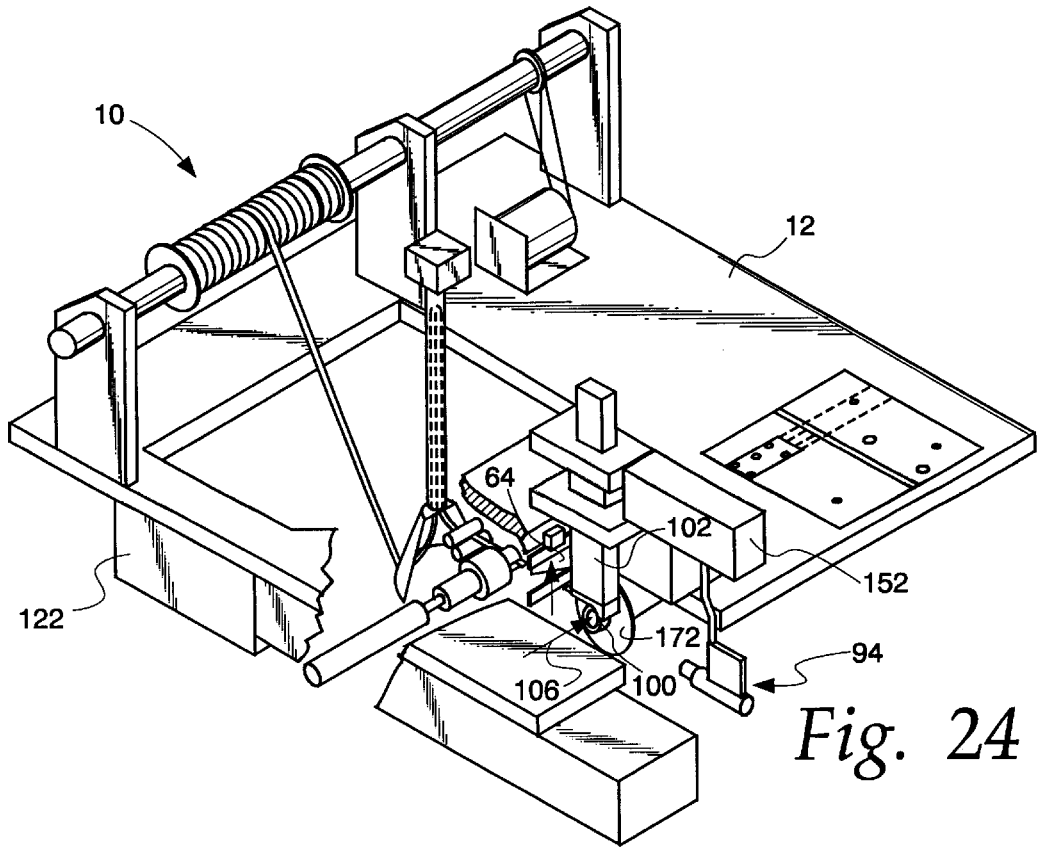

With reference to FIG. 24, the spindle jaws 72 are retracted in the direction of arrow 106, as described above with reference to FIG. 13. Consequently, the rolled ribbon segment 100 is supported exclusively by holder 102. As indicated in FIG. 24, the cutting blade 64 is reset for subsequent operation and solenoid 160 (see FIG. 22) is actuated under control of controller 130 to retract the cutting plate to the "home" position illustrated in FIG. 15a.

Figure 25:
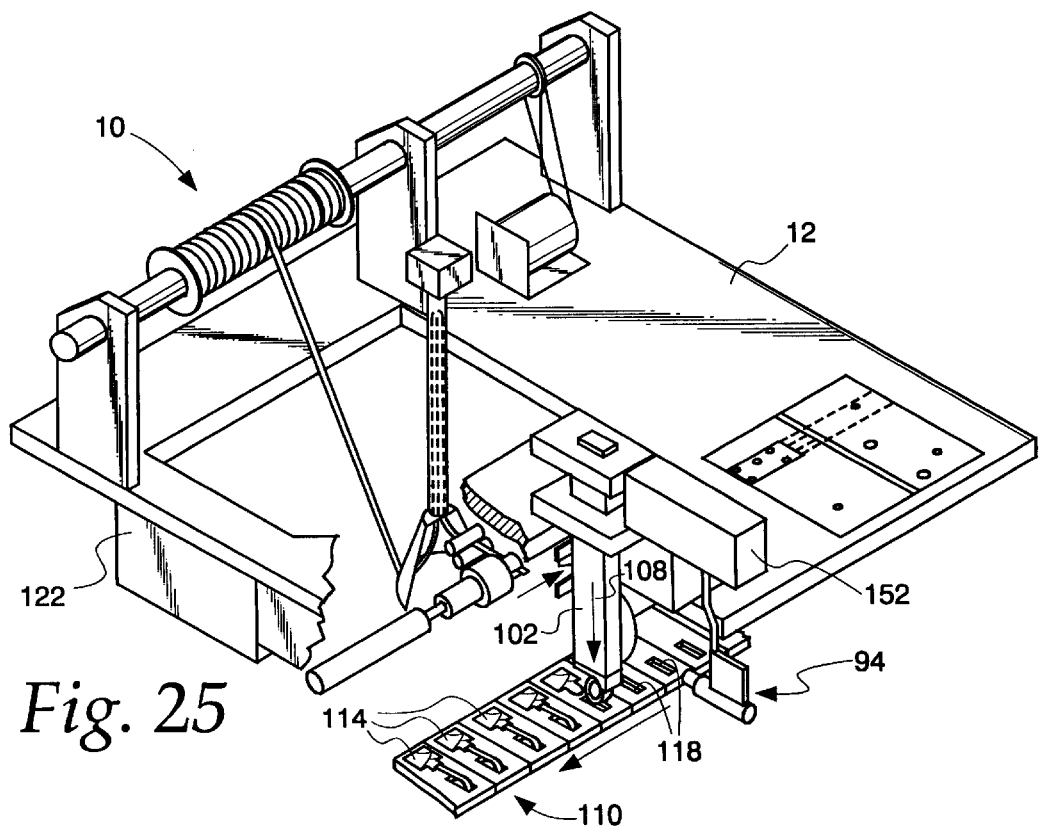

Turning now to FIG. 25, holder 102 is lowered in a direction of arrow 108, in the manner described above with reference to FIG. 13, to place the rolled ribbon segments 100 in pockets 118, as described above with reference to FIG. 29. FIGS. 26–28 show the conveyor apparatus 110 in greater detail. As indicated in FIGS. 25 and 29, for example, a plurality of pocketed segments 180 are provided in a side-by-side serial array. The pockets travel along guide rails 182 under force of a conveyor belt, driven by motor 186 (see FIG. 27).

Turning now to FIGS. 30–35, spindle 68 will be described in greater detail. Spindle 68 includes an outer housing 180 having a forward end 182 and a rearward end 184. Motor coupling 186 couples a motor driven shaft 188 to a splined shaft 190. Splined shaft 190 is in turn received in a splined bushing 192 carried on a traveling shuttle 194. Shuttle 194 is supported from housing 180 by bearings 196. Shuttle 194 carries a mounting plate 198 carrying mounting shafts 200. Spindle jaws 72 are mounted on support shafts 200 for movement between the closed position illustrated in FIG. 30, 34 and 35 and the open position illustrated in FIGS. 31–33. A sleeve 202 is mounted at the forward end 182 of housing 180 by roller bearing member 204. The collar 202 is keyed with jaws 72 for a fixed angular position with respect to the jaws. However, the shuttle 194, the jaws 72 and collar 202 are mounted for rotation about the central axis of body 180.

Figure 30:
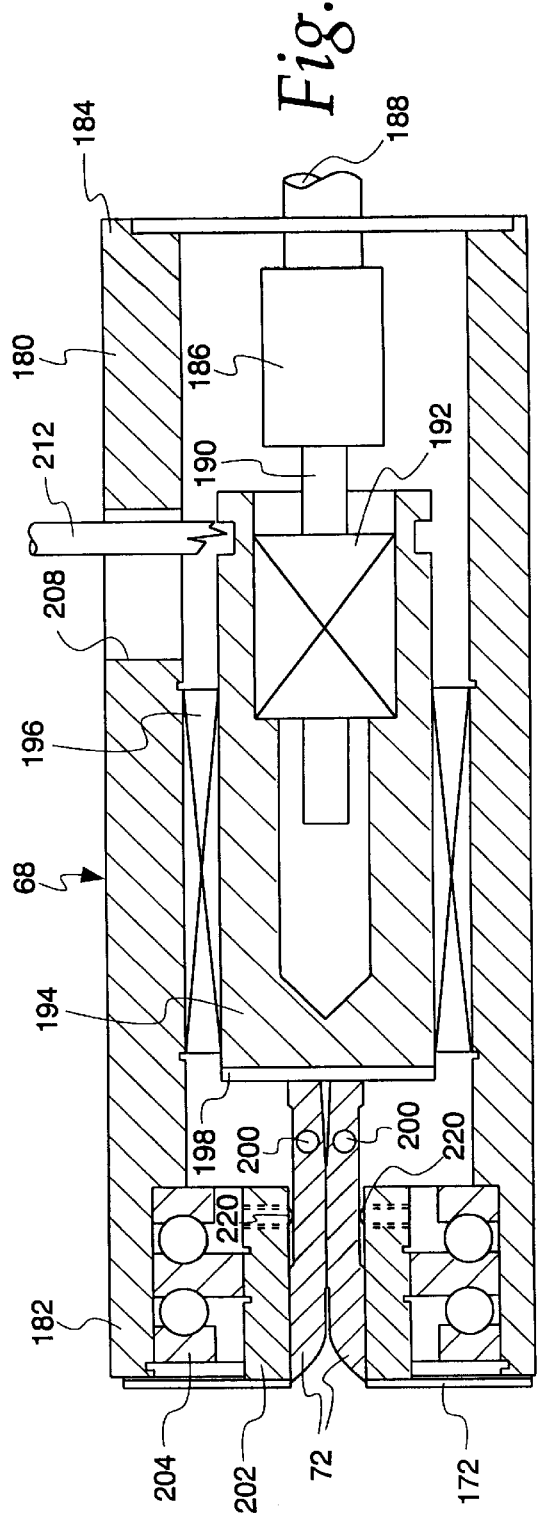
FIG. 30 is a cross-sectional view showing the spindle apparatus of FIG. 3 in greater detail.
Figure 31:
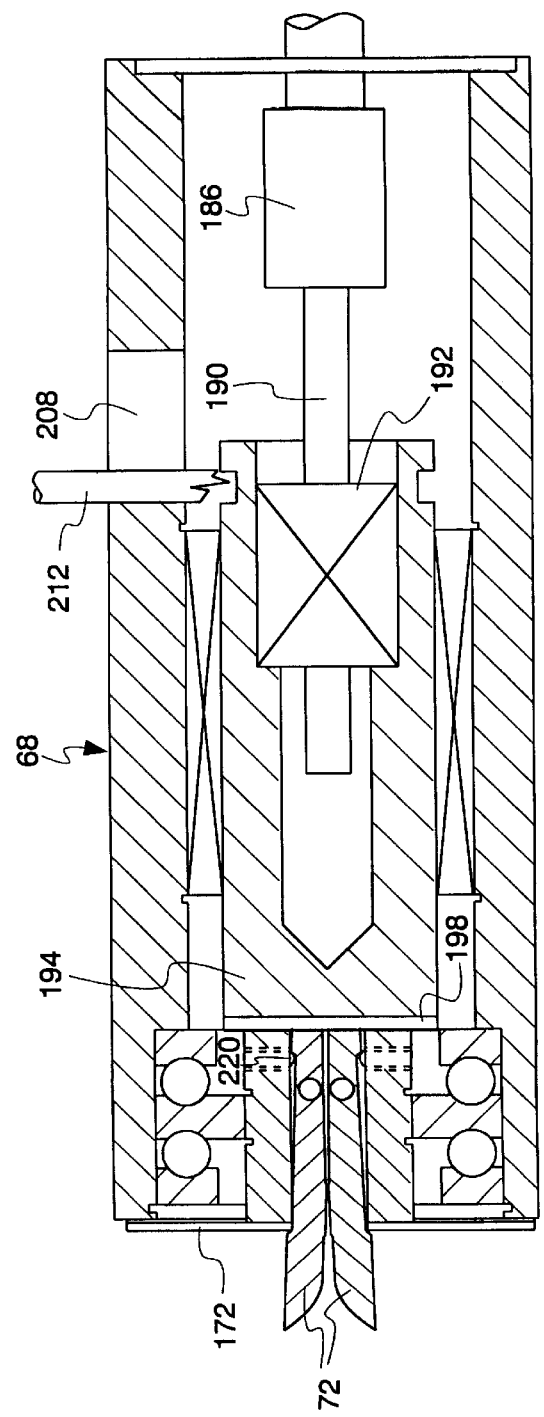
FIG. 31 is a view similar to FIG. 30 but showing a subsequent stage of operation.

Referring to FIGS. 30 and 31, an opening 208 is formed in body 180 to allow movement of an actuator rod between the retracted position illustrated in FIG. 30 and the extended position illustrated in FIG. 31. Rod 212 engages the recessed rear end of shuttle 194 so as to move the shuttle back and forth along the central axis of housing 180. As shown in FIGS. 30 and 31, this causes the jaws 72 to extend and retract with respect to wall portion 172 carried on the forward end 182 to a body 180.

A pair of spring loaded bearing balls 220 are located at the rearward end of collar 202. The bearing balls are spring loaded for movement toward the central axis of body 180. As the support shafts 200 pass beyond the bearing balls 220, as illustrated in FIG. 31, radially inward pressure is directed against the rearward end of the jaws in the manner indicated, thus opening the forward end of the jaws. The splined shaft 190 and splined bushing 192 engage one another to insure that the slot 230 between jaws 72 extend in a horizontal position (as indicated in FIG. 33), so as to accommodate the orientation of ribbon 30 in its defined path of travel until commanded to rotate by the controller, through action of a drive motor (connected through coupling 186).

The jaws 72 expand in the manner indicated in FIG. 32 so as to define the desired inner diameter of the rolled ribbon segments 100. As the jaws 72 are retracted in an axial direction (i.e., are moved from the configuration shown on FIG. 31 to that shown on FIG. 30), a frictional engagement will be maintained between the jaws and the inner winding of the rolled ribbon segment. Even though the washer-like wall portion 172 is provided to constrain the rolled ribbon segment, an additional aid in unloading the rolled ribbon segments is provided, as described above. As indicated in FIG. 34, the jaws 72 are brought together (i.e., are collapsed in a radially inward direction) automatically as the jaws are retracted in an axial direction (i.e., toward the configuration shown in FIG. 30). Frictional engagement of the jaws 72 is removed from the rolled ribbon segment by reason of their collapse, thus further facilitating the unloading of the rolled ribbon segment from the portions of apparatus directly associated with winding operations. Thus, ribbon materials can be employed which are inherently more difficult to handle (i.e., are thinner, more flexible, or engage the spindle jaws in an unusually tenacious manner).

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Apparatus for supplying segments of a ribbon having opposed major surfaces of preselected width, comprising:
   a spool carrying a supply of the ribbon to be dispensed, the ribbon having a free end;
   gripper means for gripping the free end;
   a workstation at which the ribbon is wound to form a roll;
   conveyor means for conveying the gripper means to the workstation;
   winding means at the workstation for engaging the ribbon adjacent its free end, for winding a segment of the ribbon to form a roll, and for supporting the roll after winding;
   cutting means between the winding means and the spool for cutting the ribbon to form a second free end of the ribbon segment wound on the roll;
   adhesive means for applying adhesive to the ribbon adjacent the second free end to secure the second free end to the roll; and
   release means for releasing the roll from the winding means.

2. The apparatus of claim 1 wherein the spool has a width at least several times greater than the preselected width, the apparatus further comprising an elongated vacuum chamber having an opening at one end and an opposed other end from which a vacuum is drawn, the chamber having a cross section sized to receive an open loop of ribbon with the opening having opposed, spaced-apart sides of width approximately equal to said preselected width, and a funnel-shaped receiver at one side of the opening, diverging away from the opening, guiding a major surface of the ribbon segment against the opposed, spaced-apart sides of the opening, so that, with a vacuum applied to the chamber, the ribbon segment is drawn into the chamber, toward the other end thereof to form an open loop within the chamber.

3. The apparatus of claim 2 wherein the gripping means is selectably releasable and the conveyor means moves the gripping means adjacent the chamber opening to support the ribbon so that drawing force from vacuum within the chamber causes the open loop to be formed from ribbon passing through the receiver.

4. The apparatus of claim 2 wherein the chamber opening has a generally rectangular configuration.

5. The apparatus of claim 2 wherein the receiver has a part conical configuration with a part circular opening for receiving ribbon segments from different radial directions, guiding the ribbon segments to the chamber opening.

6. The apparatus of claim 2 wherein the gripping means travels along a path of travel and the winding means includes a rotatably driven spindle having a free end movable toward and away from the path of travel of the gripping means so as to move toward the ribbon conveyed by the gripping means and away from the roll after winding.

7. The apparatus of claim 6 wherein the release means includes a plate defining an aperture through which the spindle passes as it is moved toward the ribbon and which interferes with the roll as the spindle is moved away from the roll.

8. The apparatus of claim 6 wherein the spindle free end includes jaws selectably movable toward each other and away from each other to form a slot for receiving the ribbon adjacent the free end carried by the gripping means.

9. The apparatus of claim 8 wherein the release means includes jaw closing means for moving the jaws toward each other to prevent interference with the roll as the spindle is moved away from the roll.

10. The apparatus of claim 8 wherein the spindle includes alignment means for angularly positioning the slot with respect to the ribbon carried by the gripping means.

11. The apparatus of claim 1 further comprising:
    unloading means for unrolling the roll from the winding means, carrying the roll away from the workstation, the unloading means including a holder having a first end with a partially recessed opening for receiving the roll;
    means for connecting the holder to a vacuum source to hold the roll in the partially recessed opening; and
    means for moving the holder away from the workstation.

12. The apparatus of claim 11 further comprising mounting means for mounting the holder for movement in vertical directions, above and below the spindle.

13. A method of making rolled ribbon segments, comprising:
    providing a supply of ribbon having a free end;
    providing cutting means for cutting the ribbon to separate a ribbon segment from the supply;
    providing a winding means for winding the ribbon into the form of a roll;
    moving the ribbon free end past the winding means;
    engaging the ribbon, adjacent its free end with the winding means;
    winding the ribbon into the form of a roll;
    cutting the ribbon to form first and second cut ends, with the first cut end forming a new free end of the supply and the second cut end forming a free end of the ribbon roll;
    securing the ribbon free end to the ribbon roll; and
    removing the roll from the winding means.

14. The method of claim 13 wherein the step of securing the ribbon free end to the ribbon roll comprises the step of adhesively securing the ribbon free end to the ribbon roll.

15. The method of claim 14 further comprising the steps of:
    providing an accumulator means for accumulating a quantity of ribbon to be rolled;
    moving the ribbon free end to the accumulator means; and
    drawing a quantity of ribbon from the supply to accumulate the quantity of ribbon in the accumulator means.

16. The method of claim 13 wherein the winding means comprises a rotatably mounted spindle having a spindle free end including jaws selectably movable toward each other and away from each other to form a slot for receiving the ribbon adjacent the free end carried by the gripping means.

17. The method of claim 16 wherein the step of engaging the ribbon adjacent its free end comprises moving the spindle along its rotational axis toward the ribbon to position the ribbon within the slot.

18. The method of claim 16 wherein the step of removing the roll from the winding means includes moving the jaws toward each other, holding the roll, and moving the spindle along its rotational axis away from the roll.

19. The method of claim 13 wherein:
    the method further comprises the step of providing unloading means including a holder movable away from the winding means and having a first end with a partially recessed opening for receiving the roll;
    the winding means comprises a rotatably mounted spindle having a spindle free end including jaws selectably movable toward each other and away from each other to form a slot for receiving the ribbon adjacent the free end carried by the gripping means; and the step of removing the roll from the winding means includes moving the jaws toward each other, engaging the roll with the holder, and moving the spindle along its rotational axis away from the roll to disengage the roll from the spindle and moving the holder away from the winding means.

20. The method of claim 19 wherein:

the holder has a first end with a partially recessed opening for receiving the roll;

the step of engaging the roll with the holder comprises evacuating the holder to hold the roll in the partially recessed opening; and the method further includes the step of removing the vacuum from the holder after moving the holder away from the winding means to deposit the roll at a location remote from the winding means.

21. A ribbon dispensing apparatus for providing a segment of ribbon having opposed major surfaces of preselected width for rapid withdrawal, comprising:

a spool carrying a supply of ribbon to be dispensed the spool having a width at least several times greater than the preselected width;

an elongated vacuum chamber having an opening at one end and an opposed other end from which a vacuum is drawn, the chamber having a cross section sized to receive an open loop of ribbon, and the opening having opposed, spaced-apart sides of width approximately equal to said preselected width; and a funnel-shaped receiver divergingly extending from the opening, guiding a major surface of the ribbon segment to at least partially block the opening, so that, with a vacuum applied to the chamber, the ribbon segment is drawn into the chamber, toward the other end thereof to form an open loop within the chamber.

22. The ribbon accumulator of claim 21 wherein the opening of the vacuum chamber has a generally rectangular configuration and the opening has opposed, spaced-apart sides of width approximately equal to said preselected width.

23. The ribbon accumulator of claim 21 wherein the receiver has a part conical configuration with a part circular opening for receiving ribbon segments from different radial directions, guiding the ribbon segments to the chamber opening.

24. The ribbon accumulator of claim 21 further comprising ribbon clamping means adjacent the chamber opening so that drawing force of vacuum within the chamber causes the open loop to be formed from ribbon entering the receiver.

25. The ribbon accumulator of claim 24 wherein the ribbon clamping means is selectably openable to allow ribbon to be withdrawn from the vacuum chamber, past the ribbon clamping means.

26. A ribbon accumulator for retaining a portion of ribbon having opposed major surfaces of preselected width for rapid withdrawal, comprising:

an elongated vacuum chamber having an opening at one end and an opposed other end from which a vacuum is drawn, the chamber having a cross section sized to receive an open loop of ribbon; and a funnel-shaped receiver divergingly extending from the opening, guiding a major surface of the ribbon segment to at least partially block the opening, so that, with a vacuum applied to the chamber, the ribbon segment is drawn into the chamber, toward the other end thereof to form an open loop within the chamber.

27. The ribbon accumulator of claim 26 wherein the opening of the vacuum chamber has a generally rectangular configuration and the opening has opposed, spaced-apart sides of width approximately equal to said preselected width.

28. The ribbon accumulator of claim 27 wherein the receiver has a part conical configuration with a part circular opening for receiving ribbon segments from different radial directions, guiding the ribbon segments to the chamber opening.

29. The ribbon accumulator of claim 26 further comprising ribbon clamping means adjacent the chamber opening so that drawing force from vacuum within the chamber causes the open loop to be formed from ribbon entering the receiver.

30. The ribbon accumulator of claim 29 wherein the ribbon clamping means is selectably openable to allow ribbon to be withdrawn from the vacuum chamber, past the ribbon clamping means.

* * * * *

UNITED STATES PATENT AND TRADEMARK OFFICE
CERTIFICATE OF CORRECTION

PATENT NO. : 5,857,636
DATED : January 12, 1999
INVENTOR(S) : Richard John Kurtz It is certified that error appears in the above-identified patent and that said Letters Patent is hereby corrected as shown below:

Column 10, line 5, change "unrolling" to --unloading--

Signed and Sealed this

Twenty-fourth Day of August, 1999

Attest:

Q. TODD DICKINSON

*Attesting Officer*  *Acting Commissioner of Patents and Trademarks*